(12) United States Patent
Liu et al.

(10) Patent No.: US 8,724,055 B2
(45) Date of Patent: May 13, 2014

(54) DISPLAY AND POLARIZER OF PHOTON-ELECTRIC CONVERSION

(75) Inventors: Chen-Yu Liu, Taipei (TW); Heng-Yao Chang, Tao-Yuan (TW)

(73) Assignee: TPK Touch Solutions Inc., Taipei (TW)

( * ) Notice: Subject to any disclaimer, the term of this patent is extended or adjusted under 35 U.S.C. 154(b) by 568 days.

(21) Appl. No.: 12/789,439

(22) Filed: May 27, 2010

(65) Prior Publication Data

US 2010/0321603 A1    Dec. 23, 2010

(30) Foreign Application Priority Data

Jun. 19, 2009    (TW) .............................. 98120567 A

(51) Int. Cl.
*G02F 1/1335*    (2006.01)
*G02F 1/135*    (2006.01)

(52) U.S. Cl.
USPC ............................................. 349/96; 349/27

(58) Field of Classification Search
USPC ......................... 349/25, 27–28, 96; 136/256
See application file for complete search history.

(56) References Cited

U.S. PATENT DOCUMENTS

| | | | |
|---|---|---|---|
| 4,452,511 A * | 6/1984 | Huffman | 349/20 |
| 6,518,493 B1 | 2/2003 | Murakami et al. | |
| 7,206,044 B2 | 4/2007 | Li et al. | |
| 2005/0094040 A1 * | 5/2005 | Wang et al. | 349/19 |
| 2006/0022910 A1 * | 2/2006 | Sekiya et al. | 345/76 |
| 2006/0061725 A1 * | 3/2006 | Chiu et al. | 349/187 |
| 2006/0076048 A1 * | 4/2006 | Gaudiana et al. | 136/246 |
| 2008/0094025 A1 | 4/2008 | Rosenblatt et al. | |
| 2008/0163923 A1 | 7/2008 | Park et al. | |
| 2009/0009675 A1 * | 1/2009 | Cho et al. | 349/43 |
| 2010/0003781 A1 * | 1/2010 | Van Duren et al. | 438/98 |
| 2010/0157195 A1 * | 6/2010 | Miyatake et al. | 349/62 |

FOREIGN PATENT DOCUMENTS

| | | |
|---|---|---|
| JP | 56077885 A | 6/1981 |
| JP | 2002229472 A | 8/2002 |
| WO | WO 2009/004908 * | 1/2009 |

* cited by examiner

*Primary Examiner* — Bumsuk Won
*Assistant Examiner* — Charles Chang
(74) *Attorney, Agent, or Firm* — Gokalp Bayramoglu

(57) ABSTRACT

The present invention relates to a display and polarizer capable of photon-electric conversion, the display capable of photon-electric conversion comprising: a first substrate having a first top surface and a first bottom surface, a second substrate having a second top surface and a second bottom surface, a liquid crystal layer disposed between said first bottom surface of said first substrate and said second top surface of said second substrate, a first polarizer disposed on said first top surface of said first substrate, and a photon-electric conversion element, wherein a light-polarized dye is added into said photon-electric conversion element to form a second polarizer attached to the second bottom surface of the second substrate, and photon energy of an incident light, which has a direction of vibration parallel to absorption axis of said light-polarized dye, is absorbed by said light-polarized dye for photon-electric conversion.

23 Claims, 4 Drawing Sheets

US 8,724,055 B2

DISPLAY AND POLARIZER OF PHOTON-ELECTRIC CONVERSION

FIELD OF THE INVENTION

The present invention relates to a display and polarizer capable of photon-electric conversion, and particularly relates to a liquid crystal display and polarizer with dye-sensitized solar cell.

BACKGROUND OF THE INVENTION

In recent years, solar cell is applied to many devices for daily use and applied to accomplish environmental protection requirement. The solar cell is applied to be a renewable energy or an auxiliary energy, and particularly to be used in many kinds of portable devices (for example a notebook or a cell phone) or in devices need large power (for example a display). Therefore, for following the trend of environmental protection, many kinds of display, for example liquid crystal display (LCD), organic light emitting diode display (OLED), touch sensitive display, etc., are developed to be a display with solar cell provided as a renewable energy or an auxiliary energy.

Presently, most of the display using solar energy as a renewable energy or an auxiliary energy is formed by placing a solar cell module on a display directly. Therefore, the thickness of such a display always increases substantially. Referring to FIG. 1, a liquid crystal display 10 is shown to be an example. After an upper polarizer 12 and a lower polarizer 14 are adhered to the upper surface and the lower surface of a liquid crystal panel 16, respectively, an extra solar cell module 18 is added to be fixed under the adhered liquid crystal panel 16. Therefore, the thickness of the liquid crystal display 10 not only includes the thicknesses of liquid crystal panel 16, upper polarizer 12, and lower polarizer 14 but also includes the thickness of the solar cell module 18. As a consequence of this structure, the thickness of the display 10 is significantly larger than the conventional display excluding the extra solar cell module 18 and can not meet the purpose of thin device.

Therefore, there is a need to provide a display capable of photon-electric conversion without significant increase in thickness of the display caused by existence of a photon-electric conversion device or a solar cell module.

SUMMARY OF THE INVENTION

An objective of this invention is to provide a display capable of photon-electric conversion. Comparing with the conventional display using solar cell module as a renewable energy or an auxiliary energy, the thickness of the display of this invention can be reduced and thinned to form a slim-type display.

Another objective of this invention is to provide a display capable of photon-electric conversion, wherein a polarizer and a photon-electric conversion element are integrated into one member. Therefore, the polarizer of the display has both of the functions of photon-electric conversion and optical polarization (light polarization), and the thickness of the display can be decreased.

Still another objective of this invention is to provide a polarizer capable of photon-electric conversion. When the polarizer is applied to a display, the polarizer can polarize the incident light and absorb part of the incident light for photon-electric conversion and providing electric power to the display without significant increase in thickness of the display for increasing the using efficiency of the incident light.

In one embodiment of the present invention, a display capable of photon-electric conversion is disclosed. The disclosed display comprises a first substrate having a first top surface and a first bottom surface, a second substrate having a second top surface and a second bottom surface, a liquid crystal layer, a first polarizer, and a second polarizer formed by adding a light-polarized dye into a photon-electric conversion element. The liquid crystal layer is disposed between the first substrate and the second substrate, and further contacts the first bottom surface of the first substrate and the second top surface of the second substrate. The first polarizer is attached to the first top surface of the first substrate and the second polarizer is attached to the second bottom surface of the second substrate. The light-polarized dye added into the photon-electric conversion element absorbs photon energy of an incident light, which has a direction of vibration parallel to absorption axis of the light-polarized dye, for photon-electric conversion and providing power to the display. Only photon energy of the incident light, which has a direction of vibration perpendicular to absorption axis of the light-polarized dye, can pass through the second polarizer to be a light source of the display. Therefore, the display can make full use of an incident light by the second polarizer, and the using efficiency of the incident light is increased. Besides, the second polarizer can perform photon-electric conversion and optical polarization simultaneously because the second polarizer plays both of the roles of the photon-electric conversion element (solar cell) and polarizer simultaneously. Accordingly it is not necessary to add any extra solar cell module to the display, and the thickness of the display can be decreased efficiently.

In one embodiment of the present invention, a display capable of photon-electric conversion is disclosed. The disclosed display comprises a first substrate, a second substrate and a liquid crystal layer. A photon-electric conversion element with light-polarized dye added therein is directly fabricated or spread on one surface of the second substrate. The first substrate has a first top surface and a first bottom surface, and the second substrate has a second top surface and a second bottom surface. The liquid crystal layer is disposed between the first substrate and the second substrate. The photon-electric conversion element directly fabricated on the surface of the second substrate can be used as a photon absorption polarizer to absorb photon energy of an incident light, which has a direction of vibration parallel to absorption axis of the light-polarized dye, for photon-electric conversion and providing power to the display. Only photon energy of the incident light, which has a direction of vibration perpendicular to absorption axis of the light-polarized dye, can pass through the second substrate for optical polarization. Therefore, the second substrate plays both of the roles of the photon-electric conversion element and the polarizer simultaneously, and the photon energy of the incident light can be fully and adequately used. So the using efficiency of the incident light is increased. It is not necessary to add any extra solar cell module to the display and the thickness of the display can be decreased efficiently because the photon-electric conversion element has both of the functions of photon-electric conversion and optical polarization.

In one embodiment of the present invention, a polarizer capable of photon-electric conversion is disclosed. The disclosed polarizer comprises a support substrate. A negative electrode, a semiconductor layer having a light-polarized dye, an electrolyte layer, a catalyst layer and a positive electrode are formed and stacked-up on the support substrate in order. The light-polarized dye in the semiconductor layer absorbs photon energy of an incident light, which has a direction of vibration parallel to absorption axis of the light-polarized dye, for photon-electric conversion. Only photon energy of the incident light, which has a direction of vibration perpendicular to absorption axis of the light-polarized dye, is allowed to pass through the polarizer for optical polarization. The electrons of the light-polarized dye are excited by the absorbed photon energy to be free electrons for photon-electric conversion. The excited electrons are transmitted out of said the polarizer by the negative electrode. The positive electrode receives the electrons transmitted from exterior circuit and transmits the received electrons to the electrolyte layer. The electrolyte layer replenishes the electrons of the light-polarized dye by the electrons transmitted from the positive electrode. Therefore, the electrolyte layer can make a reduction for the light-polarized dye continuously. The catalyst layer is provided to accelerate the reduction of the light-polarized dye. By this way, the polarizer can perform photon-electric conversion continuously to provide electric power to the display when the polarizer performs optical polarization of the incident light.

DESCRIPTION OF THE EXEMPLARY EMBODIMENTS

Although the present invention will be described in accordance with the embodiments shown below, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Figure 1:
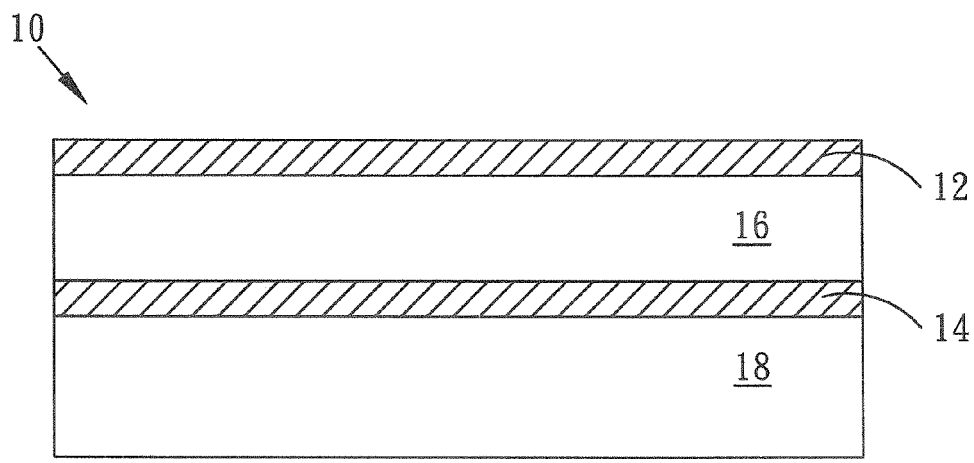
FIG. 1 is a schematic cross-section view showing a conventional display with a solar cell module.
Figure 2:
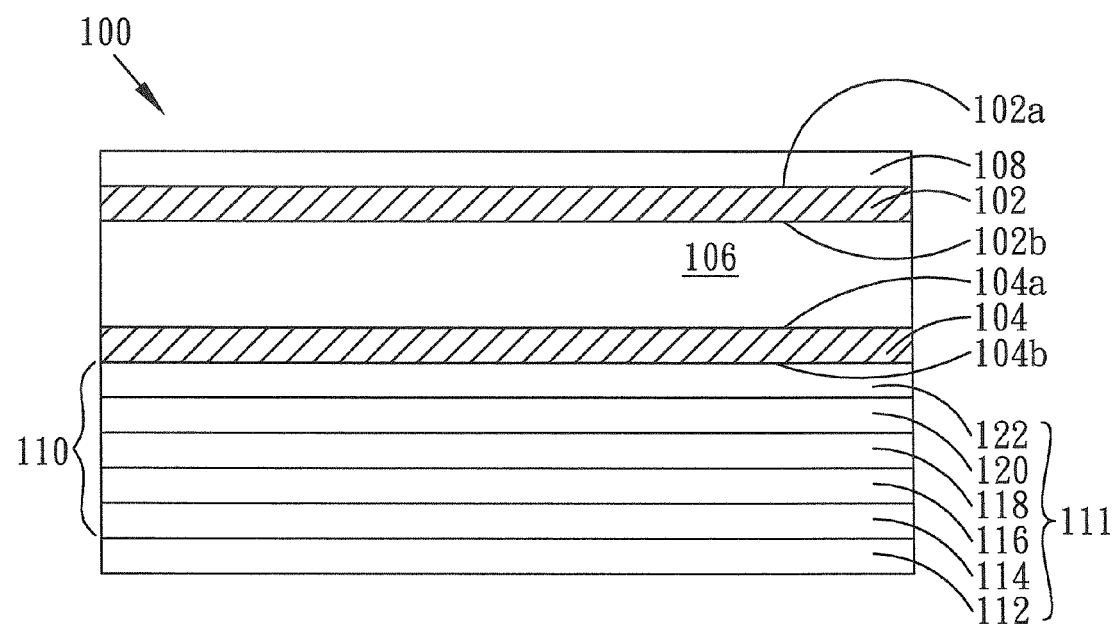
FIG. 2 is a schematic cross-section view showing a display with solar cell in accordance with one embodiment of the present invention.

FIG. 2 is a schematic cross-section view showing the display 100 capable of photon-electric conversion in accordance with one embodiment of the present invention. The display 100 comprises a first substrate 102, a second substrate 104, a liquid crystal layer 106, a first polarizer 108, and a second polarizer 111 formed by adding a light-polarized dye into a photon-electric conversion element 110. The first substrate 102 has a first top surface 102a and a first bottom surface 102b, and the second substrate 104 has a second top surface 104a and a second bottom surface 104b. Both of the first top surface 102a of the first substrate 102 and the second top surface 104a of the second substrate 104 face the same direction, and the first bottom surface 102b of the first substrate 102 and the second top surface 104a of the second substrate 104 face to each other. The liquid crystal layer 106 is between the first bottom surface 102b of the first substrate 102 and the second top surface 104a of the second substrate 104. The first polarizer 108 is attached to the first top surface 102a of the first substrate 102 to be the front polarizer of the display 100. The second polarizer 111, which is formed by adding a light-polarized dye into a photon-electric conversion element 110, is attached to the second bottom surface 104b of the second substrate 104 to replace the conventional polarizer having only a polarizing function.

The second polarizer 111 comprises a support substrate 112, and the photon-electric conversion element 110 formed on the support substrate 112 comprises a negative electrode 114, a semiconductor layer 116 having the light-polarized dye therein, an electrolyte layer 118, a catalyst layer 120 and a positive electrode 122. The negative electrode 114, the semiconductor layer 116 having a light-polarized dye, the electrolyte layer 118, the catalyst layer 120 and the positive electrode 122 are fabricated or spread on the support substrate 112 from bottom to top in order for forming the second polarizer 111. The negative electrode 114 is disposed on the support substrate 112 and the semiconductor layer 116 is disposed on the negative electrode 114. The electrolyte layer 118 is disposed on the semiconductor layer 116 and the catalyst layer 120 is disposed on the electrolyte layer 118, and the positive electrode 122 is disposed on the catalyst layer 120. The positive electrode 122 of the second polarizer 111 can be attached to the bottom surface 104b of the second substrate 104 by an adhesive material (not shown in FIG. 2) to let the second polarizer 111 be laminated under the second substrate 104.

When an incident light illuminates the second polarizer 111, the light-polarized dye added into the semiconductor layer 116 absorbs photon energy of the incident light, which has a direction of vibration parallel to absorption axis of the light-polarized dye. Only photon energy of the incident light, which has a direction of vibration perpendicular to absorption axis of the light-polarized dye, is not absorbed by the light-polarized dye and is allowed to pass through the semiconductor layer 116, and further other layers of the second polarizer 111, to function as the light source of the display 100, thus the polarizing function of the incident light is achieved. The photon energy absorbed by the light-polarized dye is applied to excite the electrons of the light-polarized dye. And then, the excited electrons of the light-polarized dye are transited from the highest occupied molecular orbital (HOMO) to the lowest occupied molecular orbital (LOMO) and then become free electrons. The free electrons are injected into the conductive band of the semiconductor layer 116 and then transmitted to an exterior circuit (not shown in FIG. 6) by the negative electrode 114. Because the lost electrons of the light-polarized dye results from the electrons being excited and injected into the conductive band of the semiconductor layer 116, the electrolyte layer 118 replenishes the lost electrons for the reduction of the light-polarized dye. And the catalyst layer 120 is provided to accelerate the reduction of the light-polarized dye. The positive electrode 122 receives the electron pairs transmitted from the exterior circuit and transmits the received electrons to the electrolyte layer 118. By the above-mentioned actions, when the incident light which may be provided by a back light module (not shown in FIG. 6) of the display 100 illuminates the second polarizer 111, the second polarizer 111 not only absorbs photon energy of the incident light, which has a direction of vibration parallel to absorption axis of the light-polarized dye, to play a role of a photon absorption polarizer but also plays a role of a dye-sensitized solar cell at the same time for converting the absorbed photon energy into the electric power and providing the electric power to the display 100 continuously.

It is not necessary to add any extra solar cell module to the display 100 because the second polarizer 111 having both of the functions of photon-electric conversion and optical polarization, hence the display 100 with photon-electric conversion function in the present invention is thinner than the conventional display 10 with an extra solar cell module. In this way, the display 100 capable of photon-electric conversion is provided without significant increasing of the thickness of the display 100. Beside, unlike the conventional photon absorption polarizer which discards the photon energy absorbed from optical polarization, the second polarizer 111 converts the absorbed photon energy into the electric power and provides the electric power to the display 100 when in the optical polarization. Therefore, the display can make full use of an incident light by the polarizer capable of photon-electric conversion, and the using efficiency of the incident light is increased.

The light-polarized dye added into the semiconductor layer 116 comprises a dichroic dye and a reactive liquid crystal wherein the dichroic dye is added into the reactive liquid crystal to achieve the effect of optical polarization. The dichroic dye is a dye which has an anisotropic absorption of visible light in a direction parallel to the direction of molecular major axis or molecular minor axis. The light-polarized dye can be a P-dichroic dye having absorption of light in the direction parallel to the direction of molecular major axis, or the light-polarized dye can be an N-dichroic dye having absorption of light in the direction parallel to the direction of molecular minor axis. Besides, the dichroic dye can be an anthraxquinone dye or an azo dye.

Figure 5A:
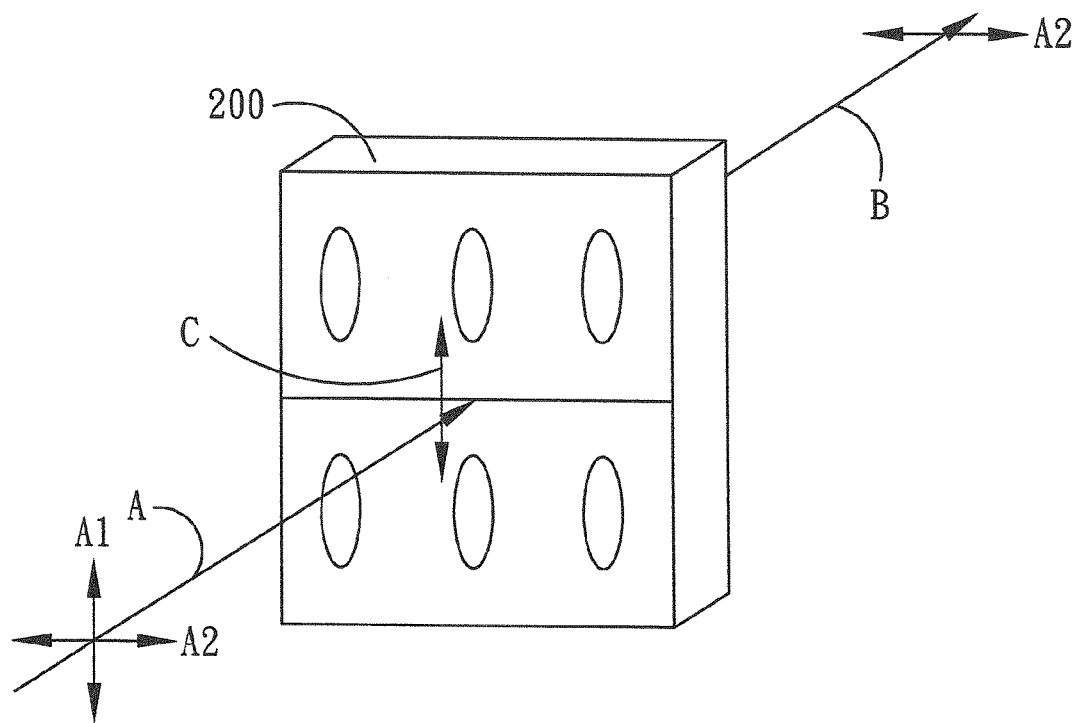
FIG. 5A is diagram illustrating how the O type polarization reactive liquid crystal in the display performs optical polarization of a incident light in accordance with one embodiment of the present invention.
Figure 5B:
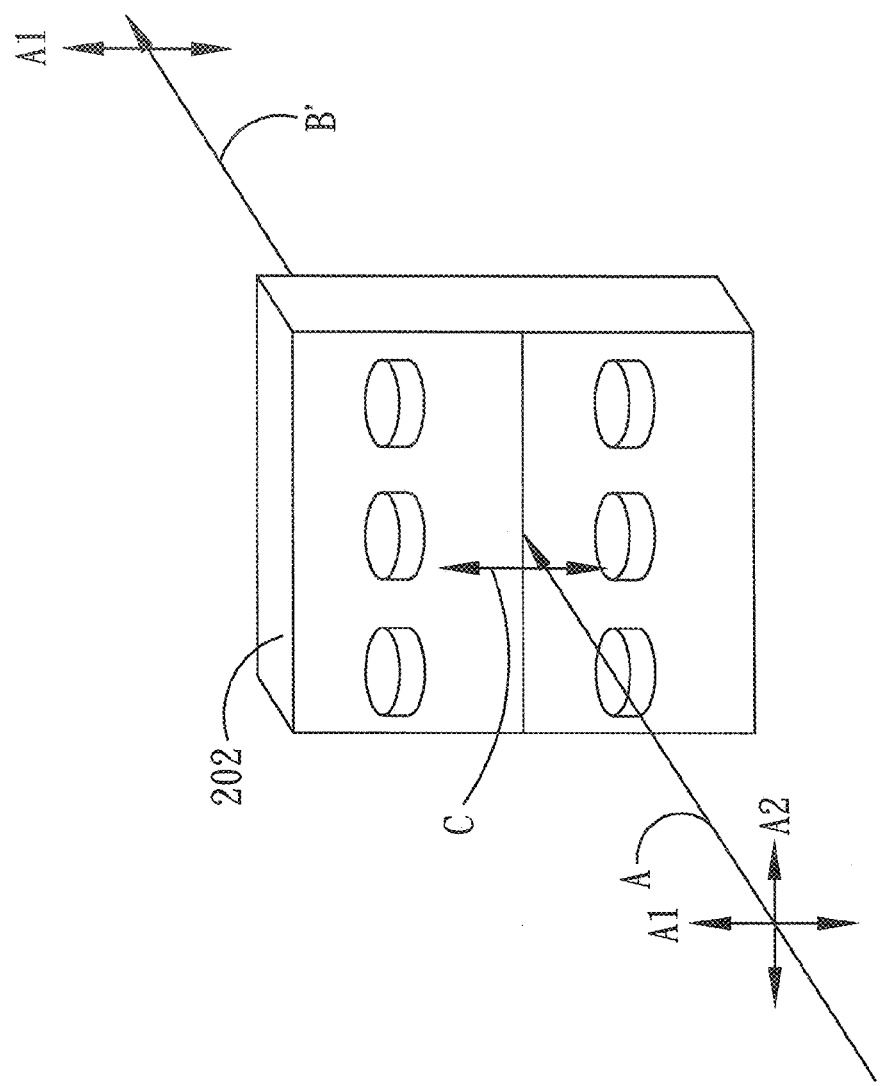
FIG. 5B is diagram illustrating how the E type polarization reactive liquid crystal in the display performs optical polarization of an incident light in accordance with one embodiment of the present invention.

According to the demand, an UV type reactive liquid crystal or a thermal type reactive liquid crystal can be applied to be the reactive liquid crystal of this invention. Furthermore, a O type polarization reactive liquid crystal, for example a rod-like reactive liquid crystal, or a E type polarization reactive liquid crystal, for example a discotic reactive liquid crystal, also can be applied to be the reactive liquid crystal of this invention. Referring to FIG. 5A, the O type polarization reactive liquid crystal 200 absorbs a component of the extraordinary wave A1 of the light A having a direction of the electric field parallel to the optical axis C, and only a component of the ordinary wave A2 of the light A having a direction of the electric field perpendicular to the optical axis C can pass through the O type polarization reactive liquid crystal 200. Therefore, a polarized light B perpendicular to optical axis C is formed by the O type polarization reactive liquid crystal 200. Referring to FIG. 5B, the E type polarization reactive liquid crystal 202 absorbs the component of the ordinary wave A2 of the light A having a direction of the electric field perpendicular to the optical axis C, and only the component of the extraordinary wave A1 of the light A having a direction of the electric field parallel to optical axis C can pass through the E type polarization reactive liquid crystal 202. Therefore, a polarized light B' parallel to optical axis C is formed by the E type polarization reactive liquid crystal.

Furthermore, the semiconductor layer 116 is a nano-scale thin film having a porous surface for increasing contact surface between the semiconductor layer 116 and the light-polarized dye, for example a porous nano-scale thin film composed of titanium dioxide. The nano-scale thin film composed of titanium dioxide has many holes in the porous surface. The light-polarized dye is spread in and attached to the porous surface of the semiconductor layer 116. The electrolyte layer 118 is in a solid state instead of a liquid state. Therefore, the following process of fabricating the second polarizer 111 becomes simpler because no electrolyte in a liquid state exists. The electrolyte layer 118 is spread in the porous surface of the nano-scale thin film for being attached to the light-polarized dye for increasing contact surface between the electrolyte layer 118 and the light-polarized dye. In this invention, the electrolyte layer 118 comprises a organic hole transport material, for example P3HT, P3OT, PDTI, MeTAD or other equivalent organic material, or the electrolyte layer 118 comprises a inorganic P-type semiconductor material, for example CuI, CuSCN or other equivalent semiconductor material.

In this embodiment, the catalyst layer 120 is a Platinum (Pt) layer or a Carbon (C) layer for accelerating the reduction of the light-polarized dye. However, in other embodiments of the present invention, many kinds of catalyst layer composed of different material are applied to the second polarizer 111 according to different requirements. The negative electrode 114 and the positive electrode 122 are composed of the material commonly used in the conventional solar cell. The support substrate 112 may be a triacetate cellulose (TAC) substrate, a polyvinyl alcohol (PVA) substrate, or a polyethylene terephthalate (PET) substrate. The first substrate 102 may be a filter substrate of a display. The second substrate 104 may be a thin film transistor (TFT) substrate or a substrate composed by thin film transistors (TFT) and a conventional electrode substrate of a display.

Figure 3A:
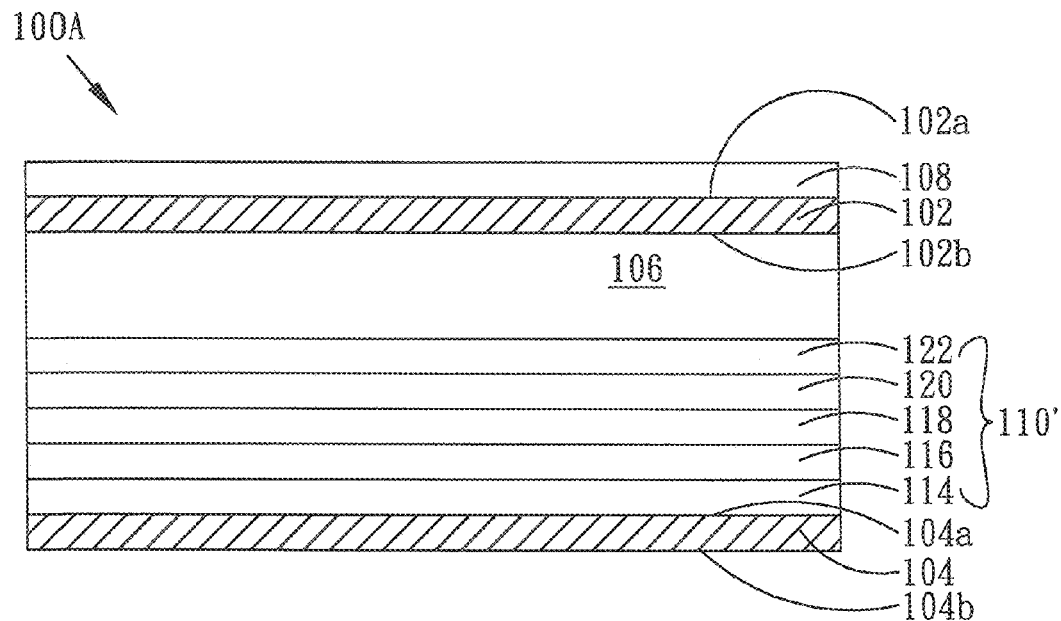
FIG. 3A is a schematic cross-section view showing a display with solar cell in accordance with another embodiment of the present invention.

FIG. 3A is a schematic cross-section view showing the display 100A capable of photon-electric conversion in accordance with another embodiment of the present invention. The display 100A comprises a first substrate 102, a second substrate 104, a liquid crystal layer 106. The liquid crystal layer 106 is disposed between the first substrate 102 and the second substrate 104. In the display 100A, the second substrate 104 is a carrier that replaces the support substrate 112 of the second polarizer 111 in the above embodiment. The photon-electric conversion element 110' with a light-polarized dye added therein is directly fabricated or spread on the second top surface 104a of the second substrate 104 for integrated the photon-electric conversion element 110' with the second substrate 104. Comparing with the display 100 shown in FIG. 6, the thickness of the display 100A is further thinner. The photon-electric conversion element 110' has both of the functions of optical polarization and photon-electric conversion. Therefore, the photon-electric conversion element 110' plays both of the role of a polarizer for optical polarization of the incident light and the role of a dye-sensitized solar cell for providing the electric power to the display 100A simultaneously. Furthermore, an upper polarizer 108 is disposed on the first top surface 102a of the first substrate 102.

The photon-electric conversion element 110' comprises a negative electrode 114, a semiconductor layer 116 having the light-polarized dye, an electrolyte layer 118, a catalyst layer 120 and a positive electrode 122. The negative electrode 114, the semiconductor layer 116 having the light-polarized dye, the electrolyte layer 118, the catalyst layer 120 and the positive electrode 122 are fabricated or spread on the second top surface 104a of the second substrate 104 from bottom to top in order. The photon-electric conversion element 110' is integrated with the second substrate 104 by directly disposing the negative electrode 114 on the second top surface 104a of the second substrate 104. Therefore, the second substrate 104 and the semiconductor layer 116 are respectively disposed on the two opposite surfaces of the negative electrode 114. The light-polarized dye added into the photon-electric conversion element 110' is composed of a dichroic dye and a reactive liquid crystal. The optical polarization function and the photon-electric conversion function of the photon-electric conversion element 110' are mentioned above and therefore no more description herein. Besides, the functions and the compositions of the components in the display 100A and the photon-electric conversion element 110' are similar with that of the components in the display 100 and the photon-electric conversion element 110, and therefore no more description herein.

Figure 3B:
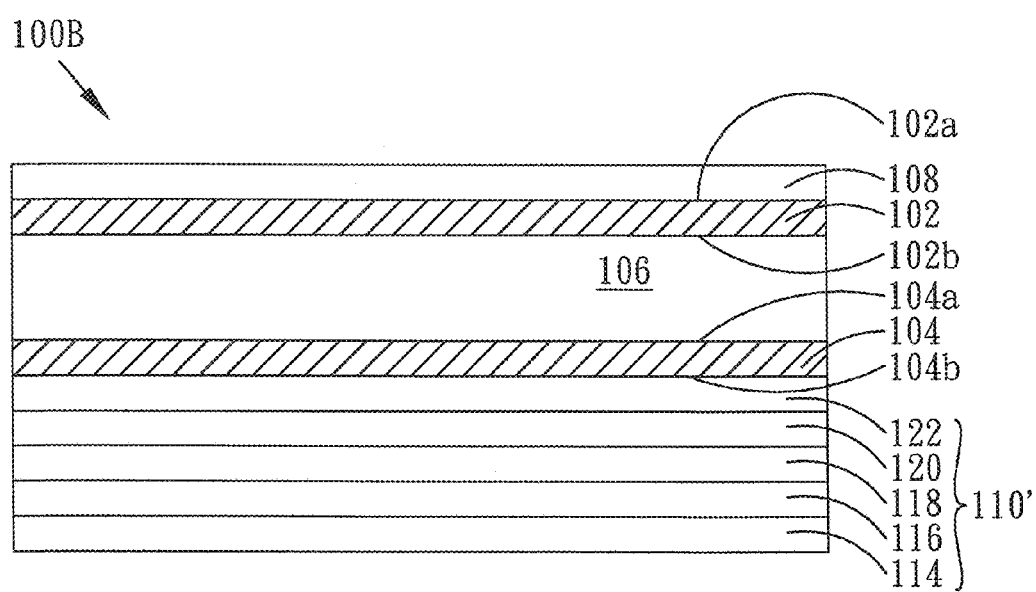
FIG. 3B is a schematic cross-section view showing a display with solar cell in accordance with still another embodiment of the present invention.

FIG. 3B is a schematic cross-section view showing the display 100B capable of photon-electric conversion in accordance with still another embodiment of the present invention. Both of the display 100B illustrated in FIG. 3B and the display 100A illustrated in FIG. 3A have the similar components, and the structure of the display 100B is also similar with the structure of the display 100A. However, the difference between the display 100A and the display 100B is that the photon-electric conversion element 110' in the display 100A is directly fabricated or spread on the second top surface 104a of the second substrate 104, but the photon-electric conversion element 110' in the display 100B is directly fabricated or spread on the second bottom surface 104b of the second substrate 104. In the display 100B, the positive electrode 122, the catalyst layer 120, the electrolyte layer 118, the semiconductor layer 116 having a light-polarized dye and the negative electrode 114 are fabricated or spread on the second bottom surface 104b of the second substrate 104 from top to bottom in order. The photon-electric conversion element 110' integrated with the second substrate 104 by directly disposing the positive electrode 122 on the second bottom surface 104b of the second substrate 104. Therefore, the second substrate 104 and the catalyst layer 120 are respectively disposed on the two opposite surfaces of the positive electrode 122.

No matter in the display 100 illustrated in FIG. 2, the display 100A illustrated in FIG. 3A or the display 100B illustrated in FIG. 3B, a photon-electric conversion element (or polarizer) with a light-polarized dye added therein is used to replace the conventional polarizer. Unlike the conventional polarizer only having the function of optical polarization, the photon-electric conversion element (or polarizer) with the light-polarized dye has both of the functions of optical polarization and photon-electric conversion. Therefore, it is not necessary to add an extra solar cell module to the display and so the thickness of the display would be decreased significantly.

Furthermore, the photon-electric conversion element (or the polarizer) with a light-polarized dye plays both of the roles of a photon absorption polarizer and a dye-sensitized solar cell simultaneously. During the optical polarization of the incident light, the photon energy which the display does not need is absorbed by the photon-electric conversion element (or the polarizer) for photon-electric conversion and for providing the electric power to the display. Therefore, the display can make full use of an incident light by the photon-electric conversion element (or the polarizer), and the using efficiency of the incident light is increased.

In embodiments of the present invention, even all of the display 100, 100A and 100B are the display capable of photon-electric conversion, but a touch element can be disposed on the liquid crystal layer, such as disposed above said liquid crystal layer or disposed under the liquid crystal layer, for forming a touch sensitive display capable of photon-electric conversion.

Figure 4:
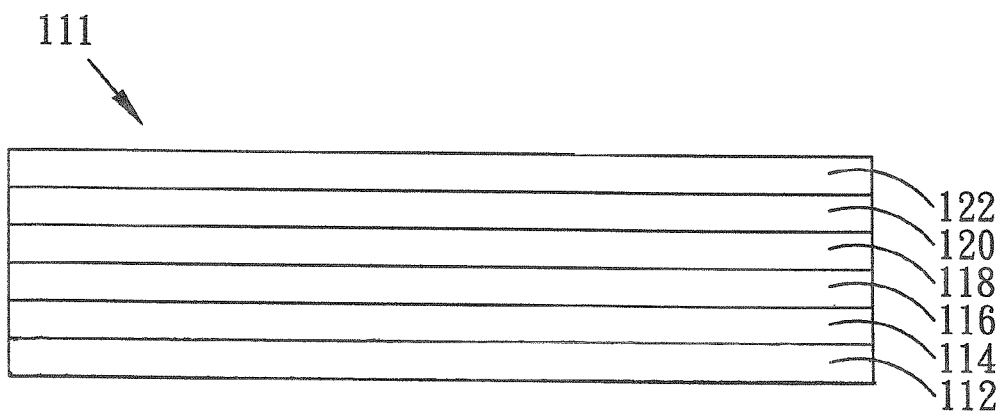
FIG. 4 is a schematic cross-section view showing a polarizer with solar cell in accordance with one embodiment of the present invention.

Furthermore, the polarizer capable of photon-electric conversion is disclosed in this invention, wherein the polarizer has both of the functions of optical polarization and photon-electric conversion. The polarizer used as a photon absorption polarizer and a dye-sensitized solar cell of a display simultaneously when it is applied to the display. FIG. 4 is a schematic cross-section view showing the polarizer 111 capable of photon-electric conversion in accordance with one embodiment of the present invention. The polarizer 111 comprises a negative electrode 114, a semiconductor layer 116 having a light-polarized dye, an electrolyte layer 118, a catalyst layer 120 and a positive electrode 122. The negative electrode 114, the semiconductor layer 116 having a light-polarized dye, the electrolyte layer 118, the catalyst layer 120 and the positive electrode 122 are fabricated or spread on a support substrate 112 from bottom to top in order for forming the polarizer 111. The light-polarized dye added into the semiconductor layer 116 is composed of a dichroic dye and a reactive liquid crystal. Therefore, the polarizer 111 has both of the functions of optical polarization and photon-electric conversion. The functions and the compositions of the components of the polarizer 111 are similar with that of the components of the second polarizer 111 in the display 100 illustrated in FIG. 2, and therefore no more description herein.

Therefore, a display and a polarizer capable of photon-electric conversion are provided in the present invention. The polarizer (or photon-electric conversion element) capable of photon-electric conversion is applied to a display in place of the conventional lower polarizer for providing both of the functions of optical polarization and photon-electric conversion to the display. In this way, the thickness of the display would be decreased significantly and the using efficiency of the incident light is increased

What is claimed is:

1. A display capable of photon-electric conversion, comprising:
    a first substrate having a first top surface and a first bottom surface;
    a second substrate having a second top surface and a second bottom surface;
    a liquid crystal layer disposed between said first bottom surface of said first substrate and said second top surface of said second substrate;
    a first polarizer disposed on said first top surface of said first substrate; and
    a photon-electric conversion element comprising a semiconductor layer and a light-polarized dye bonded onto the semiconductor layer, wherein the light-polarized dye is added into said photon-electric conversion element to form a second polarizer attached to the second bottom surface of the second substrate, and photon energy of an incident light, which has a direction of vibration parallel to absorption axis of said light-polarized dye, is absorbed and converted into an electric power by a combination of said light-polarized dye and the semiconductor layer.

2. The display of claim 1, wherein said incident light, which has a direction of vibration perpendicular to absorption axis of said light-polarized dye, can pass through the second polarizer to be a light source of said display.

3. The display of claim 1, wherein said second polarizer comprises a support substrate, and the photon-electric conversion element formed on said support substrate comprising:
    a negative electrode for transmitting excited electrons;
    an electrolyte layer disposed on said semiconductor layer having said light-polarized dye for replenishing the lost electrons from said light-polarized dye for reduction of said light-polarized dye;

a catalyst layer disposed on said electrolyte layer for accelerating said reduction of said light-polarized dye; and a positive electrode disposed on said catalyst layer for receiving external electrons and transmitted said external electrons to said electrolyte layer, wherein the semiconductor layer is disposed on said negative electrode, the light-polarized dye is bonded onto a surface of the semiconductor layer;

wherein after absorbing said photon energy of an incident light having a direction of vibration parallel to absorption axis of said light-polarized dye, the light-polarized dye is in an excited state, and then free electrons generated from the excited state light-polarized dye are injected to the semiconductor layer.

4. The display of claim 1, wherein said light-polarized dye comprises a dichroic dye.

5. The display of claim 4, wherein said dichroic dye is selected from a group consisting of P-dichroic dye, N-dichroic dye, anthraxquinone dye and azo dye.

6. The display of claim 1, wherein said light-polarized dye comprises a reactive liquid crystal.

7. The display of claim 6, wherein said reactive liquid crystal is selected from a group consisting of O type polarization reactive liquid crystal, E type polarization reactive liquid crystal, UV type reactive liquid crystal and thermal type reactive liquid crystal.

8. The display of claim 3, wherein said semiconductor layer is a nano-scale thin film having a porous surface for increasing contact surface between said semiconductor layer and said light-polarized dye, and said light-polarized dye is spread on and attached to said porous surface of said semiconductor layer.

9. The display of claim 3, wherein said electrolyte layer is in a solid state and said electrolyte layer comprises an organic electric hole transport material or a inorganic P-type semiconductor material.

10. The display of claim 8, wherein said electrolyte layer is spread on said porous surface of said semiconductor layer for attaching to said light-polarized dye for increasing contact surface between said electrolyte layer and said light-polarized dye.

11. The display of claim 3, wherein said catalyst layer is a Platinum (Pt) layer or a Carbon (C) layer.

12. The display of claim 1, further comprising a touch element disposed on said liquid crystal layer.

13. A polarizer capable of photon-electric conversion, wherein said polarizer comprises a support substrate, and elements formed on said support substrate comprising:

a negative electrode for transmitting excited electrons;

a semiconductor layer having a light-polarized dye disposed on said negative electrode for absorbing and converting photon energy of an incident light having a direction of vibration parallel to absorption axis of said light-polarized dye in order to excite electrons of said light-polarized dye to be free electrons for photon-electric conversion;

an electrolyte layer disposed on said semiconductor layer having said light-polarized dye for replenishing the lost electrons from said light-polarized dye for reduction of said light-polarized dye; and a positive electrode disposed above said electrolyte layer for receiving external electrons and transmitted said external electrons to said electrolyte layer.

14. The polarizer of claim 13, wherein said light-polarized dye comprises a dichroic dye.

15. The polarizer of claim 14, wherein said dichroic dye is selected from a group consisting of P-dichroic dye, N-dichroic dye, anthraxquinone dye and azo dye.

16. The polarizer of claim 13, wherein said light-polarized dye comprises a reactive liquid crystal.

17. The polarizer of claim 16, wherein said reactive liquid crystal is selected from a group consisting of O type polarization reactive liquid crystal, E type polarization reactive liquid crystal, UV type reactive liquid crystal and thermal type reactive liquid crystal.

18. The polarizer of claim 13, wherein said semiconductor layer is a nano-scale thin film having a porous surface for increasing contact surface between said semiconductor layer and said light-polarized dye, and said light-polarized dye is spread on and attached to said porous surface of said semiconductor layer.

19. The polarizer of claim 13, wherein said electrolyte layer is in a solid state and said electrolyte layer comprises a organic electric hole transport material or a inorganic P-type semiconductor material.

20. The polarizer of claim 18, wherein said electrolyte layer is spread on said porous surface of said semiconductor layer for attaching to said light-polarized dye for increasing contact surface between said electrolyte layer and said light-polarized dye.

21. The polarizer of claim 13, further comprising a catalyst layer disposed between said electrolyte layer and said positive electrode for accelerating said reduction of said light-polarized dye.

22. The polarizer of claim 21, wherein said catalyst layer is a Platinum (Pt) layer or a Carbon (C) layer.

23. The polarizer of claim 21, wherein said support substrate is a triacetate cellulose (TAC) substrate, a polyvinyl alcohol (PVA) substrate, or a polyethylene terephthalate (PET) substrate.

* * * * *